US008550553B1

(12) United States Patent
Clark et al.

(10) Patent No.: US 8,550,553 B1
(45) Date of Patent: Oct. 8, 2013

(54) SIDE MOUNTED ENERGY ATTENUATING VEHICLE SEAT (75) Inventors: Douglas Richard Clark, Chandler, AZ (US); Terry Wilhelm, Gilbert, AZ (US); Joshua Platt, Concord, CA (US)

(73) Assignee: Armorworks Enterprises LLC, Chandler, AZ (US)

( * ) Notice: Subject to any disclaimer, the term of this patent is extended or adjusted under 35 U.S.C. 154(b) by 98 days.

(21) Appl. No.: 13/274,559

(22) Filed: Oct. 17, 2011

Related U.S. Application Data (60) Provisional application No. 61/394,675, filed on Oct. 19, 2010.

(51) Int. Cl.
*B60N 2/42* (2006.01)
(52) U.S. Cl.
USPC .................................. 297/216.17; 297/216.16
(58) Field of Classification Search
USPC ............... 297/216.1, 216.16, 216.17
See application file for complete search history.

(56) References Cited

U.S. PATENT DOCUMENTS

| | | | |
|---|---|---|---|
| 3,619,006 A | 11/1971 | Barecki | |
| 3,968,863 A | 7/1976 | Reilly | |
| 3,985,388 A | 10/1976 | Hogan | |
| 4,349,167 A | 9/1982 | Reilly | |
| 4,440,441 A | 4/1984 | Marrujo et al. | |
| 4,474,347 A | 10/1984 | Mazelsky | |
| 4,523,730 A * | 6/1985 | Martin | 244/122 R |
| 4,525,010 A * | 6/1985 | Trickey et al. | 297/216.17 |
| 5,125,598 A | 6/1992 | Fox | |
| 5,273,240 A * | 12/1993 | Sharon | 244/122 R |
| 5,676,336 A | 10/1997 | Nefy et al. | |
| 5,788,185 A | 8/1998 | Hooper | |
| 5,842,669 A | 12/1998 | Ruff | |
| 6,257,663 B1 * | 7/2001 | Swierczewski | 297/216.19 |
| 6,561,580 B1 | 5/2003 | Bergey | |
| 6,585,190 B2 | 7/2003 | Mort | |
| 6,692,069 B2 * | 2/2004 | Beroth et al. | 297/118 |
| 7,445,181 B2 | 11/2008 | Knoll et al. | |
| 7,513,558 B2 | 4/2009 | Hansen | |
| 7,658,425 B2 | 2/2010 | Paxton et al. | |
| 7,744,155 B2 * | 6/2010 | List et al. | 297/216.17 |
| 7,758,095 B2 | 7/2010 | Elhanany | |
| 7,938,485 B1 | 5/2011 | Perciballi et al. | |
| 8,087,723 B2 | 1/2012 | Honnorat et al. | |
| 2009/0066126 A1 * | 3/2009 | Stevens | 297/216.17 |
| 2009/0267391 A1 | 10/2009 | Honnorat et al. | |
| 2011/0079681 A1 | 4/2011 | Honnorat | |

* cited by examiner

*Primary Examiner* — Sarah B McPartlin
(74) *Attorney, Agent, or Firm* — James L. Farmer (57) ABSTRACT

Designs and methods are provided for a side mounted energy attenuating vehicle seat. In one exemplary embodiment the seat comprises a rigid base with a first side, and a substantially vertically oriented mounting plate adjacent the first side of the base. The exemplary seat further comprises a vertical slide mechanism comprising a fixed portion attached to the mounting plate, and a sliding portion attached to the first side of the base, the mechanism configured to allow for a downward stroke of the base relative to the mounting plate. A roller is attached to the first side of the base substantially below the point of attachment to the sliding portion of the vertical slide mechanism, and configured to roll in a vertical direction while bearing against the mounting plate, and supporting the seat base in a horizontal orientation. An energy attenuating member is positioned so as to prevent the seat from stroking downward relative to the mounting plate during normal use.

20 Claims, 10 Drawing Sheets

SIDE MOUNTED ENERGY ATTENUATING VEHICLE SEAT

CROSS REFERENCE TO RELATED APPLICATIONS

This document claims the benefit of the filing date of U.S. Provisional Patent Application 61/394,675, entitled "Cantilever Mounted Energy Attenuating Vehicle Seat" to Wilhelm, which was filed on Oct. 19, 2010, the contents of which are hereby entirely incorporated by reference.

TECHNICAL FIELD AND BACKGROUND

The present disclosure relates broadly to energy attenuating systems and devices, and more particularly for example, systems and devices for attenuating under-vehicle blast and aircraft slam-down impact forces. Such devices may include those integrated into seating systems for military aircraft, including but not limited to, fixed and rotary wing aircraft, and all ground vehicles, including tracked and wheeled vehicles of current or future designs, which function as crew and cargo transport and combat fighting vehicles. The technology field may further relate to energy attenuating systems in civilian transportation of all types, such as automobiles, trucks, buses, rail transport systems and commercial and civilian aircraft, ground vehicles for firefighters and other rescuer transport vehicles. Such energy attenuating systems or devices may help reduce impact loading resulting from crash, slam down, under-vehicle blast, and other events, on vehicle occupants, thereby improving survivability of, and mitigating injury to the vehicle occupants.

DETAILED DESCRIPTION

The present invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Further, the term "vehicle" as used herein means any land, air, sea, or space vehicle, including for example cars, trucks, military land vehicles of all kinds, aircraft, helicopters, and any other mobile means for transporting personnel or cargo from one place to another.

Figure 1:
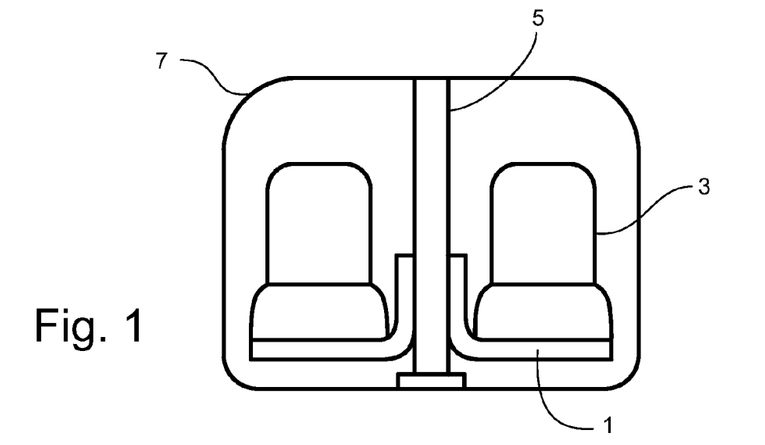
FIG. 1 is an elevation of a vehicle compartment depicting a pair of seats side mounted to a structural column.

Referring to FIG. 1, a vehicle seat 3 is side mounted to a supporting surface within a vehicle 7 by a mount system 1. The supporting surface within a vehicle may be for example a side wall of the vehicle shell, an interior bulkhead or sponson, or as depicted in FIG. 1, the sides of a structural column 5 supporting a pair of seats. The mount system 1 is rigid under normal operating conditions, and compliant in a downward direction (relative to the vehicle) when exposed to extremely high rate vertical accelerations, such as would accompany an under-vehicle mine blast event. Compliance is achieved through use of a unique slide system coupled with an energy attenuating device that allows the seat to stroke vertically relative to the vehicle, and absorb an energy pulse in a single stroke.

One exemplary embodiment of an energy attenuating mount system in accordance with the present disclosure is shown in FIGS. 2 through 5. The mount system 1 comprises generally a seat base 10, a vertical slide mechanism 12 that slidably connects a side of the seat base 10 to the vehicle, a roller 28 that supports the seat base in a horizontal orientation, and an energy attenuating link 16 attached to the slide mechanism 12. The vertical slide mechanism 12 may be any type of slide or track that provides for uninhibited, uniaxial vertical motion of the seat base 10 relative to the supporting surface. In the exemplary embodiment of FIGS. 2 through 5, the slide mechanism 12 comprises a fixed portion attached the vehicle, and a sliding portion attached to the seat base 10. In particular, the sliding portion of slide mechanism 12 comprises a bushing structure, referred to herein as a slide block 20, that is attached to, or integral with an upper portion of the side of the seat base 10 facing structural column 5. The fixed portion comprises a vertical guide rod 22 supported substantially parallel to and spaced apart from the column 5 by means of a generally U-shaped bracket 24. A bore 26 through slide block 20 lined with suitable bushings allows the slide block and the seat base 10 to slide freely along the guide rod 22 in a vertical direction. Bracket 24 may be integral with or attached to a mounting plate 15 that is in turn fastened to column 5. In one embodiment the seat base 10, mounting plate 15, slide block 20, and bracket 24 are all made of a lightweight metal such as aluminum, and the vertical guide rod 22 is a round steel tube.

Figure 6:
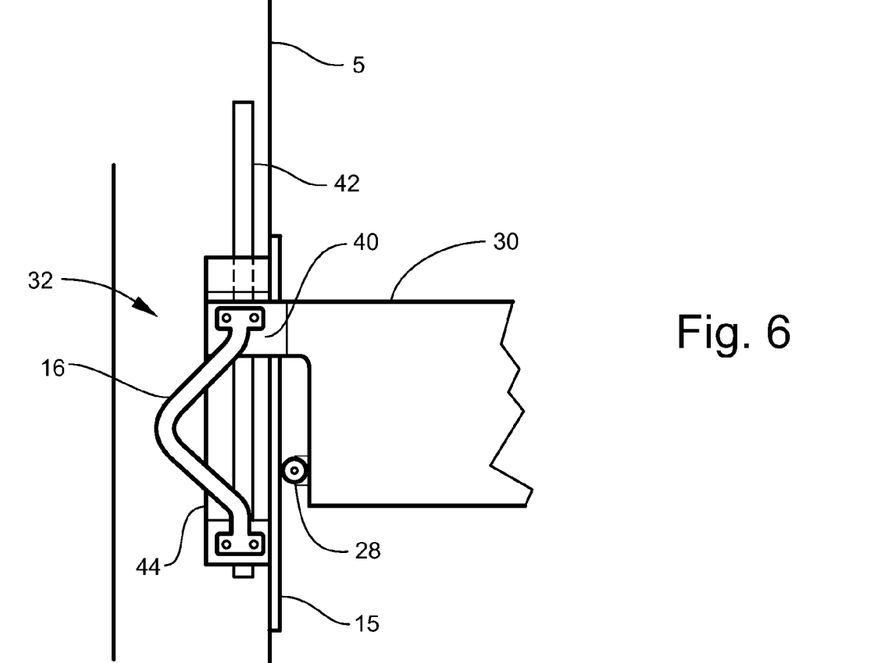
FIG. 6 is a front view of another exemplary mounting system with an alternative sliding mechanism design.
Figure 7:
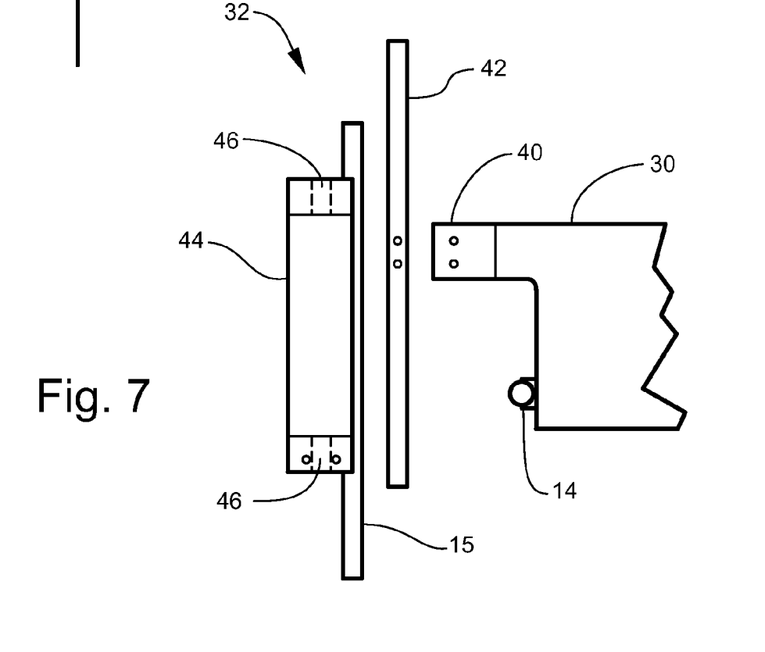
FIG. 7 is an exploded view of the seat mounting system of FIG. 6.

FIGS. 6 and 7 show an alternative embodiment of a sliding mechanism portion of the seat mount system 1. A vertical slide mechanism 32 comprises a U-shaped bracket 44, similar in appearance to bracket 24 previously described, however configured with through-bores 46 at each end for slidably receiving a vertical guide rod 42. Through-bores 46 may be lined with suitable bushings to minimize sliding friction between the bracket 44 and guide rod 42. A mounting block 40 attached to, or integral with, the upper portion of the seat base 30 is rigidly fastened to the guide rod 42, thus providing for the seat base 30 and guide rod 42 to slide together as a unit within the vertical boundaries of bracket 44. It should be appreciated that guide rod 42 is substantially longer than guide rod 22 of the previously described embodiment, extending far enough above the top of bracket 44 to always stay engaged with both ends of the bracket.

Figure 4:
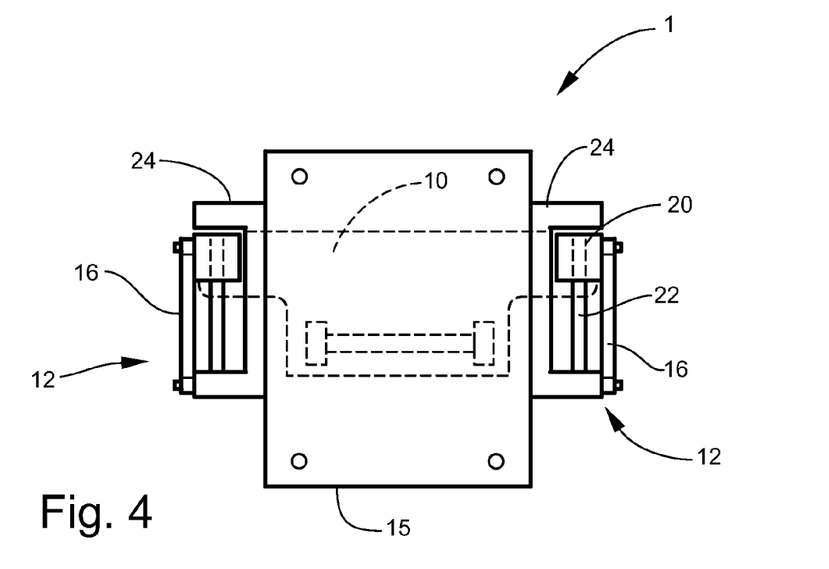
FIG. 4 is a side view of the seat mounting system of FIG. 2.
Figure 5:
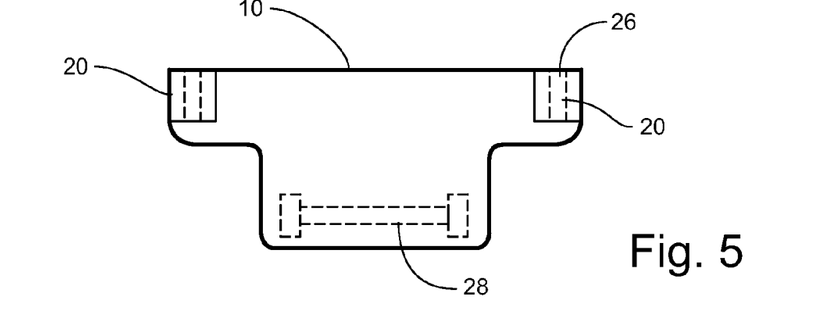
FIG. 5 is the side view of FIG. 4 showing only the seat base.

As shown in the side views of FIGS. 4 and 5, an exemplary side mounted vehicle seat preferably comprises a pair of slide mechanisms 12 (or 32) that are spaced apart and generally proximal the front and back edges of the seat base 10. In the depicted embodiment, brackets 24 and 44 of the slide mechanisms extend forward and rearward from mounting plate 15, placing the vertical guide rods 22 and 42 generally on opposite sides of mounting plate 15. Alternatively, the brackets 24 and 44 may be rotated 90 degrees (not shown) so as to extend away from mounting plate 15 toward the seat base 10.

The side mounted vehicle seat further incorporates a roller 28 on, or extending from the side of the seat base 10 facing the mount plate 15, and positioned substantially below the sliding attachments 20, 40. The roller 28 supports the seat base 10 in a horizontal orientation, and is configured to roll in a vertical direction against a vertical surface such as mount plate 15. The roller 28 may be comprised of one roller, or multiple spaced apart rolling elements. In the embodiment shown in FIGS. 4 and 5, the roller 28 comprises two spaced apart rollers that engage front and back portions of mounting plate 15. It should be appreciated that the support provided by roller 28 allows the moment from a vertical seat load to be reacted primarily as side loads on the slide mechanisms 12, 32 and roller 28. It should be further appreciated that the greater the vertical spacing between the slide mechanism attachments 20, 40, and roller 28, the less the applied side forces for a given seat loading event, and the less the sliding and rolling friction. Accordingly, from the standpoint of sliding efficiency it is generally desirable to maximize the spacing between the slide mechanism attachment points and roller 28 within the physical constraints of any particular installation.

Figure 2:
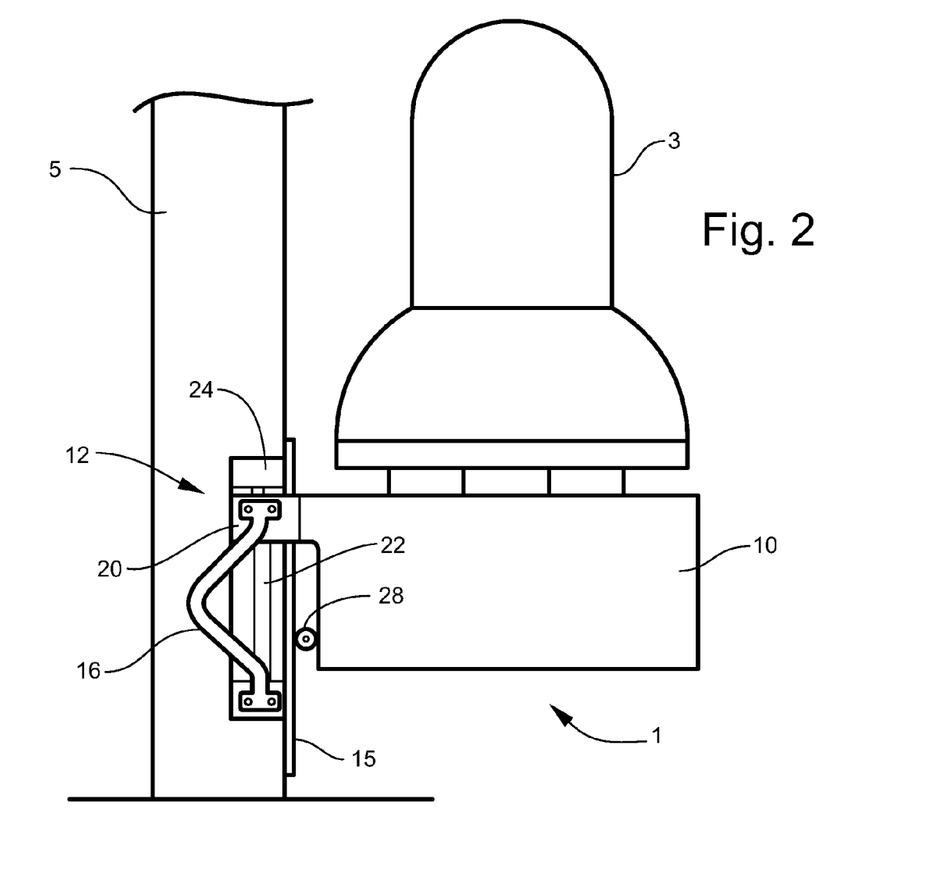
FIG. 2 is a front view of a vehicle seat, side mounted to a vertical column by an energy attenuating mounting system in accordance with the present invention.

The roller 28 along with blocks 20, 40 may be permanently attached to, or integral with the side of seat base 10 as illustrated for example in FIGS. 2 and 6. However where adaptability is a greater concern, roller 28 and blocks 20, 40 may be separate and detachable from the side of seat base 10. Such a configuration could allow for mounting of the seat via either side of an appropriately designed reversible or universal seat base 10. For example, blocks 20, 40 may be permanent elements of slide mechanisms 12, 32, instead of seat base 10, and attachable to either side of a seat base 10 with fasteners. Similarly, appropriately configured rollers 28 may be detachably mounted to either side of such a reversible seat base.

Figure 3:
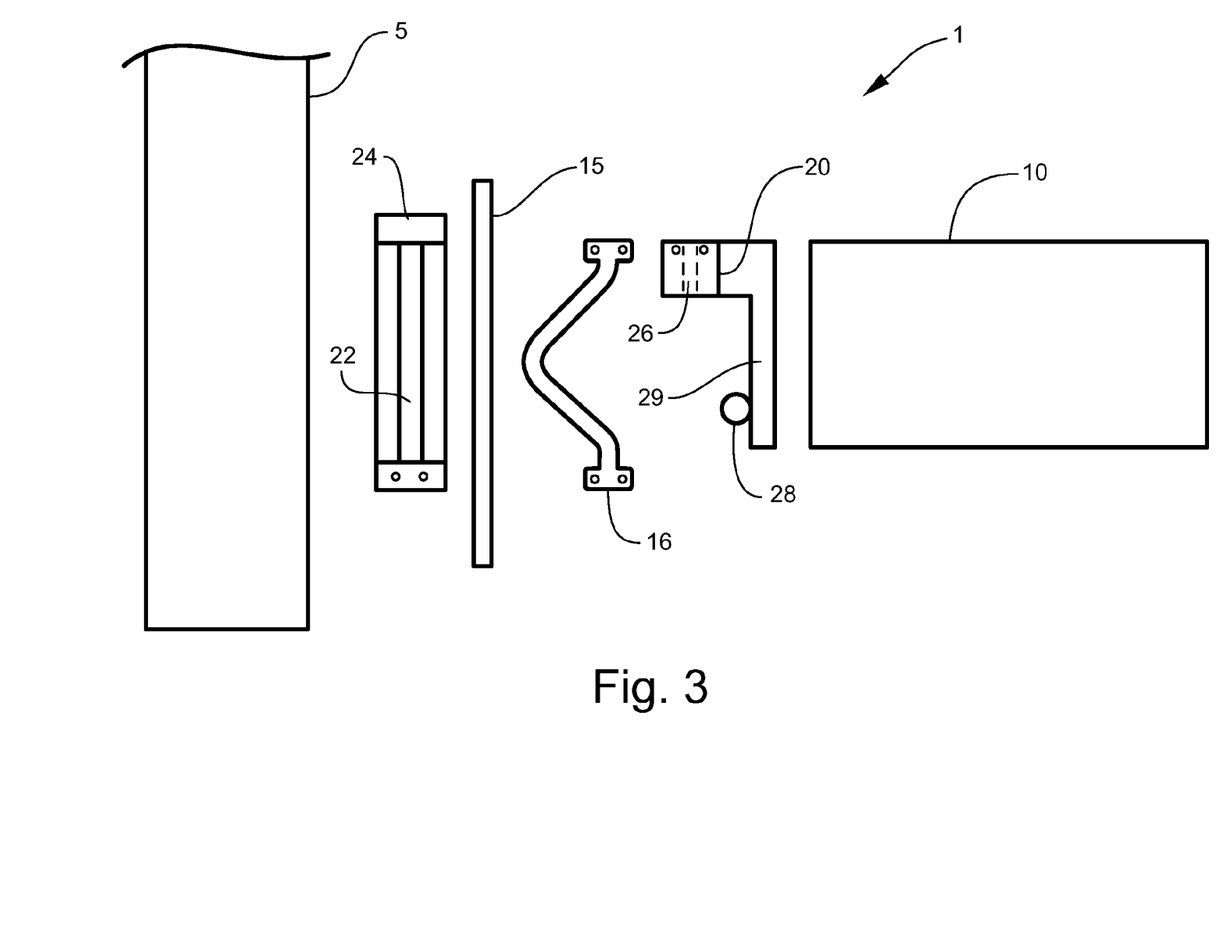
FIG. 3 is an exploded view of the mounting system of FIG. 2, further comprising a seat attachment bracket.

Alternatively, the blocks 20, 40, and roller 28 may be attached to, or form integral parts of a separate seat attachment bracket 29 such as shown in FIG. 3. A seat attachment bracket approach may further contemplate retrofitting of various alternative seats and seat bases to the mount system of the present invention using additional adapter plates or hardware as required.

Under normal conditions the seat base 10 is prevented from sliding downward relative to mounting plate 15 by an energy attenuating (EA) link 16 attached to the sliding mechanism 12 (or 32). The EA link is attached at one end to the slide block 20 (or mount block 40), and at the other end to the bottom of bracket 24 (or 44). The EA link may be any crushable element designed to absorb the energy imparted by the vehicle structure to the seat in a sudden impact event such as an under-vehicle mine blast. For example, the exemplary EA link 16 may be an elongated solid metal bar comprising straight sections and bends as depicted, or alternatively any bent, curved, or sinusoidal design. EA link 16 may also include at least two fastener points at each end to prevent rotation. Each seat mount system 1 may comprise one or more EA links 16 connected to respective sliding mechanisms 12, 32. An exemplary EA link is described in U.S. Pat. No. 7,938,485, assigned to the assignee of the present invention, the entire contents of which are hereby incorporated by reference.

Figure 8:
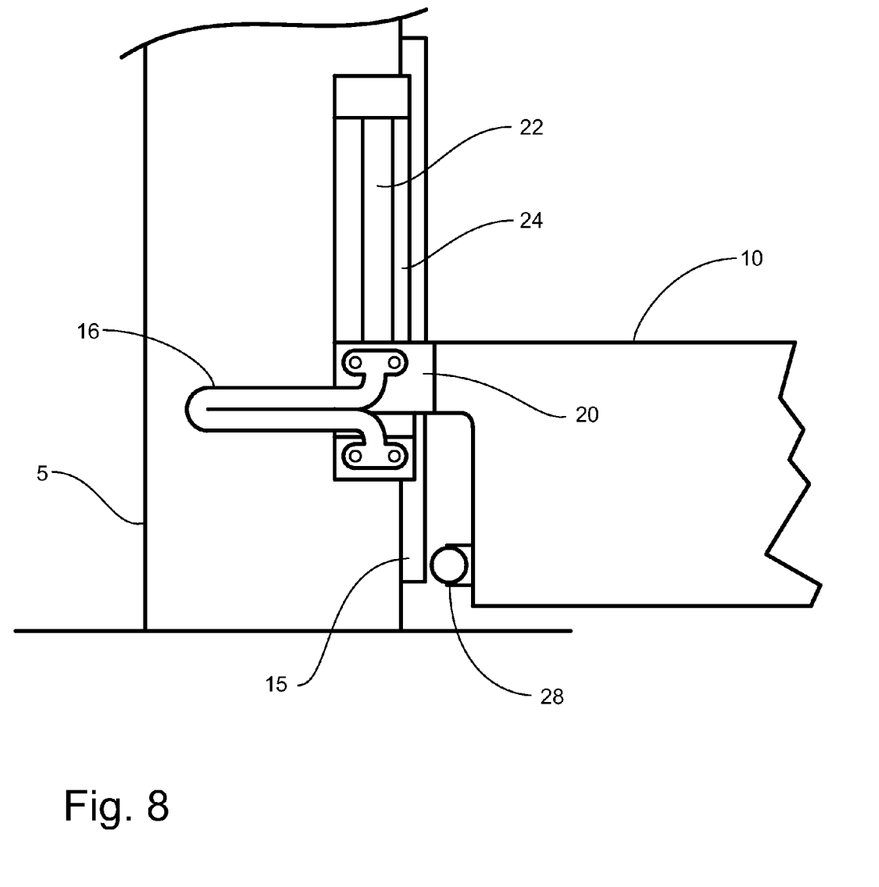
FIG. 8 is a depiction of the mount system of FIG. 2 after a downward stroke.

In the event of a sudden impact (e.g., under-vehicle mine blast or slam-down), mount system 1 allows the seat carrying the occupant to independently stroke downward relative to the vehicle, and in an attenuated manner against the supporting force of the EA links 16. The guide rods 22, 42 control the bending direction of the EA links 16, and prevent twisting during vertical displacement. FIG. 8 depicts the seat base and mounting system as it would appear after a downward stroke, with the slide mechanism 12 bottomed out, and EA link 16 completely collapsed.

The exemplary EA links 16 are designed to substantially absorb the impact energy, and may be custom tunable by modifying their material thickness, and/or shape. In one exemplary implementation, the present seat mount system may attenuate an impact of a 6.5 meters-per-second pulse, such as may result from an under-vehicle mine or IED explosion. The exemplary mount system 1 may also be capable of withstanding the following road shock loads transmitted through the vehicle chassis structure: 10 G's vertical, 8 G's longitudinal, and 5 G's transverse. In other exemplary embodiments, the seating assembly 10 may incorporate other or additional known energy attenuation links or devices. Although the EA links 16 may protect the occupant for multiple impact events, it is generally considered disposable and is easily replaced to restore a maximum level of protection to the mounting system 1.

Another exemplary side-mounted, energy attenuating seat system in accordance with the present invention is shown in FIGS. 9 through 13. Referring in particular to the exploded view of FIG. 9, a side mounted energy attenuating seat 3 comprises cushions 61, 62, and seat frame members 63, 64, 65, a seat base 10, and an adjustable track system 66. The seat frame members 63-65 and seat base 10 may be fabricated from a light weight material such as aluminum. A vertical slide mechanism 12 of the general type described previously in reference to FIGS. 2-5 is attached to a front edge of a mounting plate 15, and a vertical slide mechanism 32 of the general type described previously in reference to FIGS. 6, 7 is attached to the rear edge of mounting plate 15. The attachment may be reinforced with addition of a stiffener 68. Slide mechanisms 12 and 32 each include at least one EA link 16.

Figure 9:
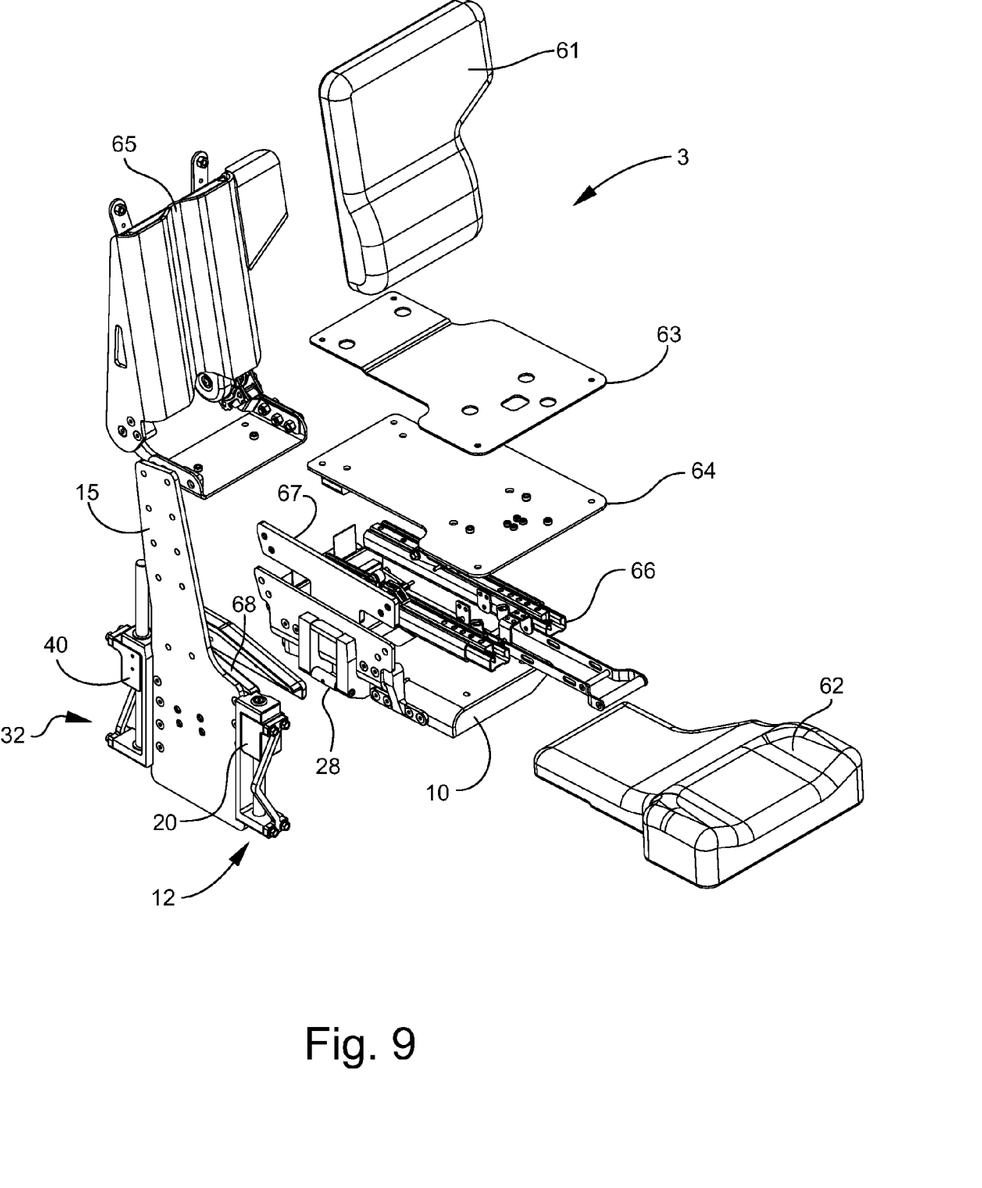
FIG. 9 is an exploded view of another embodiment of an integrated side mounted vehicle seat of the present invention.
Figure 10:
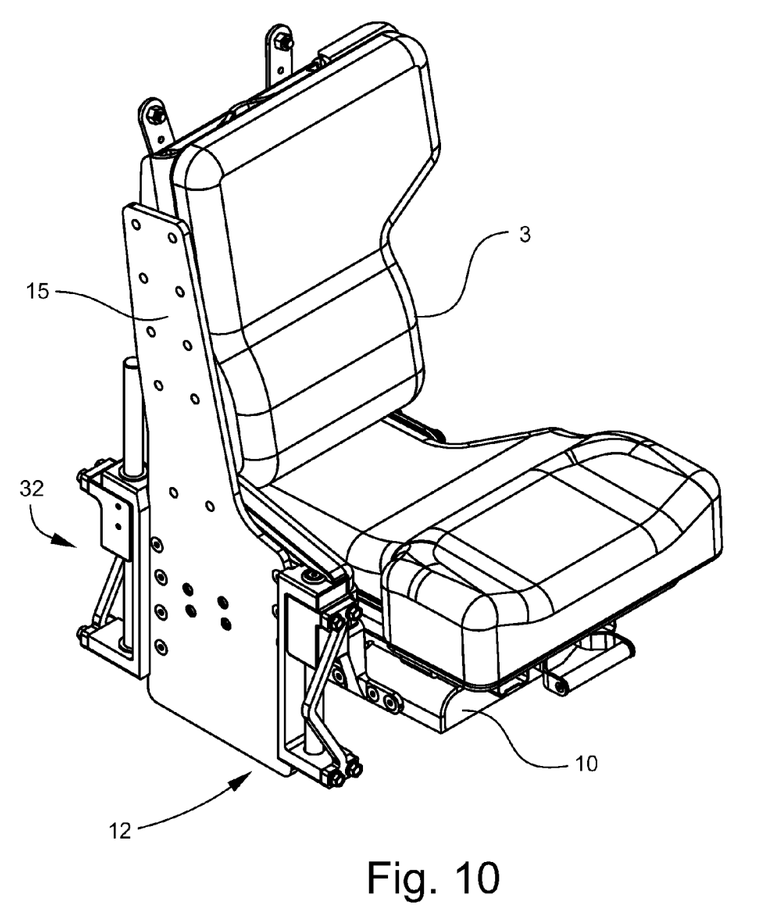
FIG. 10 is a perspective view of the embodiment of FIG. 9.

An upper portion of the seat base 10 is attached to a block 20 of the front sliding mechanism 12 and a block 40 of the rear sliding mechanism 32. A backing plate 67 may be incorporated to enhance stability of the assembly. Seat base 10 further incorporates a roller 28 on the side facing plate 15, located substantially below the point of attachment of the seat base 10 to the blocks 20, 40. A lower portion of mounting plate 15 may serve as a bearing surface for roller 28 to react the moment load imparted by seat inertia forces.

Figure 11:
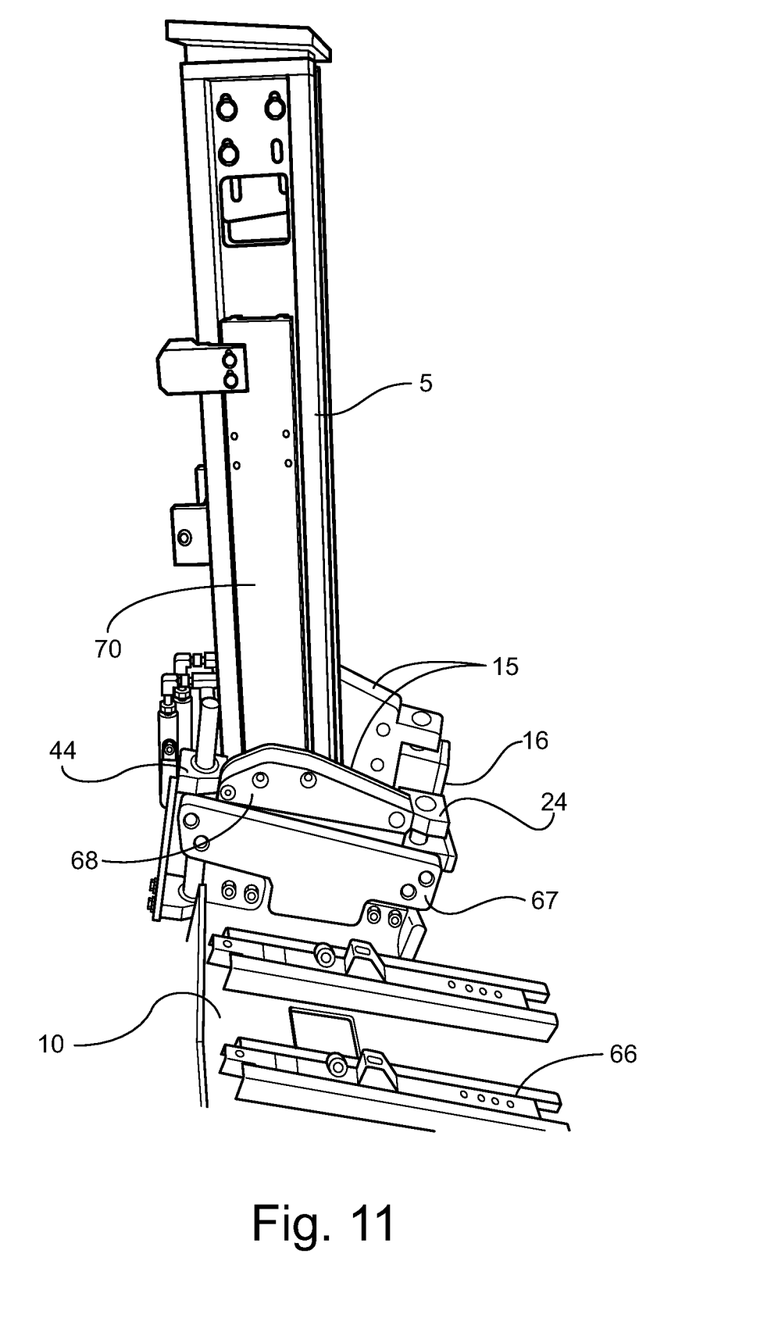
FIG. 11 is a perspective view showing a pair of side mounted seats attached to either side of a structural column of the type used in a driver compartment of a military vehicle.
Figure 12:
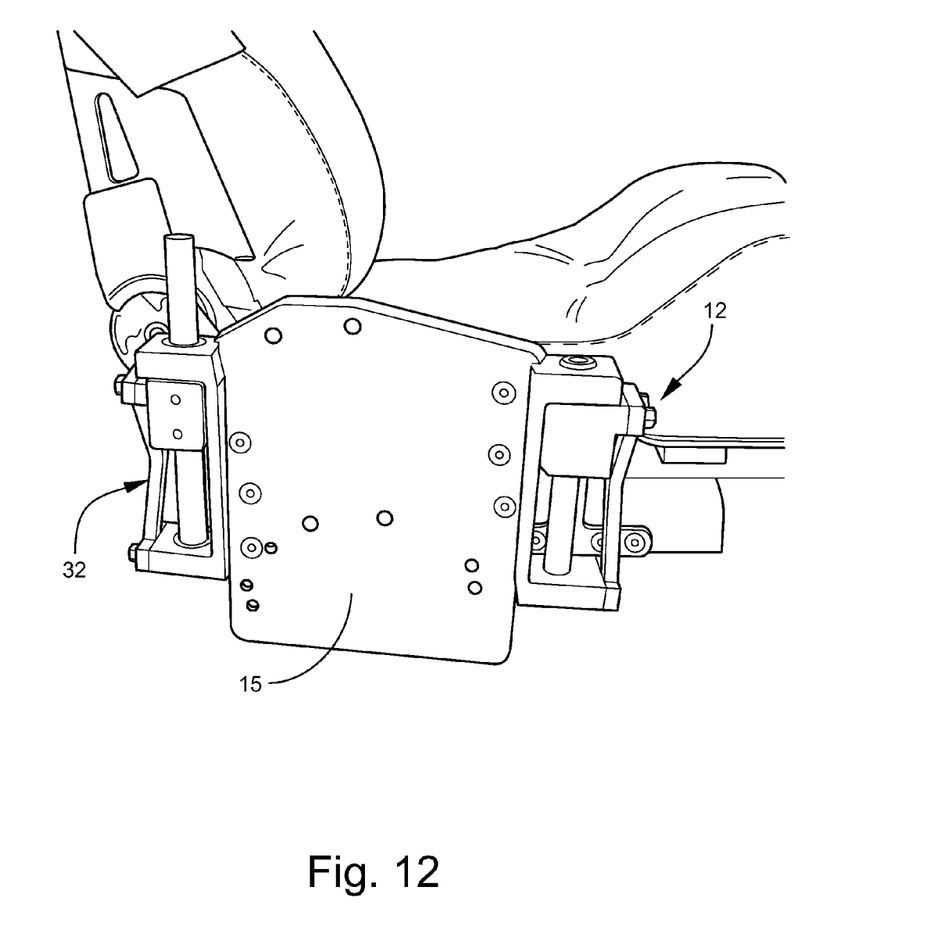
FIG. 12 is a side view of the side mounted seat shown in FIG. 11.

FIG. 11 depicts a structural column 5 of the type used in the U.S. military's ASV family of vehicles supporting a pair of side mounted energy attenuating seats (without some frame and cushion portions). The column 5 comprises essentially a pair of vertical tracks, each of which contains a slide 70 that is moveable along the track, and lockable at any desired vertical position. The side mounted seat of the present invention may be attached to the slide 70 such as by a mounting plate 15. Attaching the seat to the slide 70 thus allows the seat to be moved and positioned vertically over a much greater range than possible with typical vehicle seat mounts.

Figure 13:
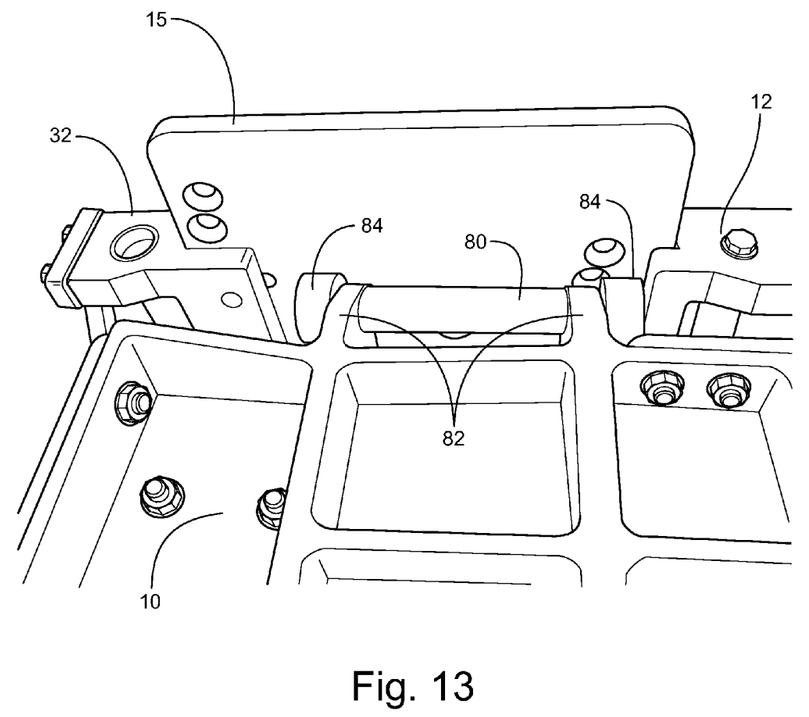
FIG. 13 is a bottom perspective view of an exemplary side mounted vehicle seat showing the roller supporting the seat base against the mounting plate.

FIG. 13 is a bottom view of an exemplary seat and mounting system showing a lightweight ribbed structure of a seat base 10. Also shown is the extension of the mounting plate 15 well past the bottom of the slide mechanisms so as to provide a bearing surface for roller 28 as the seat strokes downward. In the embodiment shown, roller 28 comprises an axel 80 supported by two flanges 82 extending from the side of seat base 10 toward column 5. The flanges 82 may be coextensive with internal structural elements of seat base 10 as shown, or detachable as previously discussed. Rolling elements 84 at each end of axel 80 bear against mount plate 15, thus maintaining the orientation of the seat and the axial alignment of the slide mechanism components during a downward seat stroke.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. For example, although the seat mount system of the present invention has been generally described and depicted in terms of a side-mounted arrangement, the same mount system is equally applicable and useful with any seat orientation. In particular, the seat mount system may be effectively positioned to support a vehicle seat from the back instead of from the side, or from any angular position in between. Accordingly, all such modifications are intended to be included within the scope of this invention as defined in the appended claims.

What is claimed is:

1. A side mounted energy attenuating vehicle seat, comprising:
    a rigid seat base with a first side;
    a substantially vertically oriented mounting plate adjacent the first side of the seat base;
    a vertical slide mechanism comprising a fixed portion attached to the mounting plate, and a sliding portion attached to the first side of the seat base, the mechanism configured to allow for a downward stroke of the seat base relative to the mounting plate, wherein the fixed portion of the vertical slide mechanism comprises a vertical guide rod fixed at each end, and the sliding portion comprises a block with a through-bore adapted to slide on the vertical guide rod;
    a roller attached to the first side of the seat base substantially below the point of attachment to the sliding portion of the vertical slide mechanism, wherein the roller is configured to roll in a vertical direction while bearing against the mounting plate and supporting the seat base in a horizontal orientation; and
    an energy attenuating member positioned so as to prevent the seat from stroking downward relative to the mounting plate during normal use.

2. The side mounted energy attenuating vehicle seat of claim 1, wherein a first end of the energy attenuating member is attached to the fixed portion of the vertical slide mechanism, and a second end of the energy attenuating member is attached to the sliding portion of the vertical slide member.

3. The side mounted energy attenuating vehicle seat of claim 2, wherein the point of attachment of the first end of the energy attenuating member to the fixed portion of the vertical slide mechanism is below the point of attachment of the second end of the energy attenuating member to the sliding portion of the vertical slide mechanism.

4. The side mounted energy attenuating vehicle seat of claim 3, wherein the energy attenuating member comprises a deformable metal link configured to absorb an instantaneous vertical acceleration of the mounting plate relative to the seat in one stroke.

5. The side mounted energy attenuating vehicle seat of claim 1, wherein the energy attenuating member is an elongated, solid metal bar, comprising straight sections and at least one bend.

6. A side mounted energy attenuating vehicle seat, comprising:
    a rigid seat base with a first side;
    a substantially vertically oriented mounting plate adjacent the first side of the seat base;
    a vertical slide mechanism comprising a fixed portion attached to the mounting plate, and a sliding portion attached to the first side of the seat base, the mechanism configured to allow for a downward stroke of the seat base relative to the mounting plate, wherein the fixed portion of the vertical slide mechanism comprises a bracket with a through bore at each end, and the sliding portion comprises a vertical guide rod slidably received in the bracket bores;

a roller attached to the first side of the seat base substantially below the point of attachment to the sliding portion of the vertical slide mechanism, wherein the roller is configured to roll in a vertical direction while bearing against the mounting plate, and supporting the seat base in a horizontal orientation; and an energy attenuating member positioned so as to prevent the seat from stroking downward relative to the mounting plate during normal use.

7. A side mounted energy attenuating vehicle seat, comprising:

a rigid seat base with a first side;

a substantially vertically oriented mounting plate adjacent the first side of the seat base;

a vertical slide mechanism comprising a fixed portion attached to the mounting plate, and a sliding portion attached to the first side of the seat base, the mechanism configured to allow for a downward stroke of the seat base relative to the mounting plate, wherein the vertical slide mechanism comprises a front vertical slide member proximate a front edge of the seat, and a rear vertical slide member proximate a rear edge of the seat;

a roller attached to the first side of the seat base substantially below the point of attachment to the sliding portion of the vertical slide mechanism, wherein the roller is configured to roll in a vertical direction while bearing against the mounting plate, and supporting the seat base in a horizontal orientation; and an energy attenuating member positioned so as to prevent the seat from stroking downward relative to the mounting plate during normal use.

8. A side mounted energy attenuating seat supported from a substantially vertical interior surface of a vehicle, comprising:

a rigid seat frame with a first side adjacent the substantially vertical interior surface;

a mounting plate disposed between the first side of the seat frame and the substantially vertical interior surface, the mounting plate attached to the substantially vertical interior surface;

a vertical slide mechanism comprising a fixed portion attached to the mounting plate, and a sliding portion attached to the first side of the seat frame, the mechanism configured to allow for guided vertical relative motion between the seat frame and the mounting plate, wherein the vertical slide mechanism comprises a front vertical slide member proximate a front edge of the seat, and a rear vertical slide member proximate a rear edge of the seat;

a roller mounted to the first side of the seat frame below the attachment point of the sliding portion of the vertical slide mechanism, wherein the roller is configured to roll in a vertical direction while bearing against the mounting plate; and an energy attenuating member adapted to resist vertical motion of the seat frame relative to the mounting plate.

9. The side mounted energy attenuating seat of claim 8, wherein the fixed portion of at least one of the vertical slide mechanisms comprises a vertical guide rod fixed at each end; and the sliding portion comprises a bushing adapted to slide on the vertical guide rod.

10. The side mounted energy attenuating seat of claim 8, wherein the fixed portion of at least one of the vertical slide mechanisms comprises a bracket with a through bore at each end, and the sliding portion comprises a vertical guide rod slidably received in the bracket bores.

11. The side mounted energy attenuating seat of claim 8, wherein a first end of the energy attenuating member is attached to the fixed portion of the vertical slide mechanism, and a second end of the energy attenuating member is attached to the sliding portion of the vertical slide mechanism.

12. The side mounted energy attenuating seat of claim 11, wherein the second end of the energy attenuating member is above the first end.

13. The side mounted energy attenuating seat of claim 11, wherein the energy attenuating member comprises a deformable metal link configured to absorb an instantaneous vertical acceleration of the substantially vertical interior surface relative to the seat in one stroke.

14. The side mounted energy attenuating seat of claim 8, wherein the energy attenuating member is an elongated, solid metal bar, comprising straight sections and at least one bend.

15. The side mounted energy attenuating seat of claim 8, wherein the mounting plate is attached to the substantially vertical interior surface in a vertically adjustable manner.

16. A side mounted energy attenuating seat supported from a substantially vertical interior surface of a vehicle, comprising:

a rigid seat frame with a first side adjacent the substantially vertical interior surface;

a mounting plate disposed between the first side of the seat frame and the substantially vertical interior surface, the mounting plate attached to the substantially vertical interior surface;

a vertical slide mechanism comprising a fixed portion attached to the mounting plate, and a sliding portion attached to the first side of the seat frame, the mechanism configured to allow for guided vertical relative motion between the seat frame and the mounting plate;

a roller mounted to the first side of the seat frame below the attachment point of the sliding portion of the vertical slide mechanism, wherein the roller is configured to roll in a vertical direction while bearing against the mounting plate; and an energy attenuating member adapted to resist vertical motion of the seat frame relative to the mounting plate, wherein the mounting plate is attached to the substantially vertical interior surface in a vertically adjustable manner, and wherein the substantially vertical interior surface is a vertical column with a vertically adjustable seat attachment plate.

17. A side mounted energy attenuating seat supported from a substantially vertical interior surface of a vehicle, comprising:

a rigid seat frame with a first side adjacent the substantially vertical interior surface;

a mounting plate disposed between the first side of the seat frame and the substantially vertical interior surface, the mounting plate attached to the substantially vertical interior surface;

a vertical slide mechanism comprising a fixed portion attached to the mounting plate, and a sliding portion attached to the first side of the seat frame, the mechanism configured to allow for guided vertical relative motion between the seat frame and the mounting plate;

a roller mounted to the first side of the seat frame below the attachment point of the sliding portion of the vertical slide mechanism, wherein the roller is configured to roll in a vertical direction while bearing against the mounting plate; and an energy attenuating member adapted to resist vertical motion of the seat frame relative to the mounting plate wherein the seat is configured to be reversible, such that the roller and the sliding portion of the vertical slide member are detachable from the seat frame, and both sides of the seat frame are configured for attachment of a roller and vertical slide member.

18. A method for side mounting a vehicle seat to an interior structural surface, comprising:

attaching a first side of the vehicle seat to the interior structural surface with a vertically sliding connection, wherein the vertically sliding connection comprises a bushing connected to the first side of the seat, the bushing slidably disposed on a substantially vertical guide rod fixed to the structural surface;

reacting the seat moment load with a roller mounted to the first side of the seat substantially below the attachment point of the vertically sliding connection, wherein the roller is configured to bear against a substantially vertical plate attached to the structural surface of the vehicle; and preventing vertical motion of the seat with an energy attenuating member disposed between the vertically sliding connection and the structural surface.

19. The method of claim 18, wherein the substantially vertical guide rod is mounted in a rod support bracket that is attached to the substantially vertical plate.

20. The method of claim 19, wherein a first end of the energy attenuating member is connected to the bushing, and a second end is connected to a bottom end of the rod support bracket.

* * * * *